(12) United States Patent  
Ortiz-Gavin

(10) Patent No.: US 7,780,303 B2  
(45) Date of Patent: Aug. 24, 2010

(54) LIGHT CONTROL AND SHADING APPARATUS AND METHODS

(76) Inventor: Sergio Alejandro Ortiz-Gavin, 6609 Santa Monica Blvd., Los Angeles, CA (US) 90038

( * ) Notice: Subject to any disclaimer, the term of this patent is extended or adjusted under 35 U.S.C. 154(b) by 0 days.

(21) Appl. No.: 11/983,265

(22) Filed: Nov. 8, 2007

(65) Prior Publication Data

US 2009/0122512 A1 May 14, 2009

(51) Int. Cl.
*G03B 15/02* (2006.01)
(52) U.S. Cl. .............................. 362/18; 362/17; 362/278
(58) Field of Classification Search .................... 362/3, 362/8, 16, 17, 18, 278, 281, 293, 319, 320, 362/356, 360, 361, 396
See application file for complete search history.

(56) References Cited

U.S. PATENT DOCUMENTS

| | | | | | |
|---|---|---|---|---|---|
| 2,707,780 | A | * | 5/1955 | Heller et al. ................. | 362/293 |
| 3,152,767 | A | * | 10/1964 | Jorgensen ................... | 362/319 |
| 4,291,365 | A | * | 9/1981 | Tandon et al. ............... | 362/281 |
| 4,633,374 | A | * | 12/1986 | Waltz et al. .................. | 362/17 |
| 7,083,303 | B2 | * | 8/2006 | Scholz ......................... | 362/18 |
| 2002/0191411 | A1 | * | 12/2002 | Nakada et al. .............. | 362/284 |
| 2007/0211475 | A1 | * | 9/2007 | Sevack et al. ............... | 362/351 |

* cited by examiner

*Primary Examiner*—Y My Quach Lee
(74) *Attorney, Agent, or Firm*—Edward C. Schewe

(57) ABSTRACT

An apparatus and methods that includes a gel holder and an optional shade holder that allows a user to add color or eliminate or reduce reflected color and to shape, shade, diffuse, soften, absorb, block, reflect, retract and dim light inside photographic reflectors such as photographic umbrellas or other reflective apparatus. The invention allows a user to mix, blend or shape light at the source and the resulting light can be symmetrical or asymmetrical. The invention allows a user to more efficiently add texture, eliminate hotspots and create shadows by changing positions of a gel holder with a gel and one or more shade holders with shades on a reflector focus tube.

17 Claims, 4 Drawing Sheets

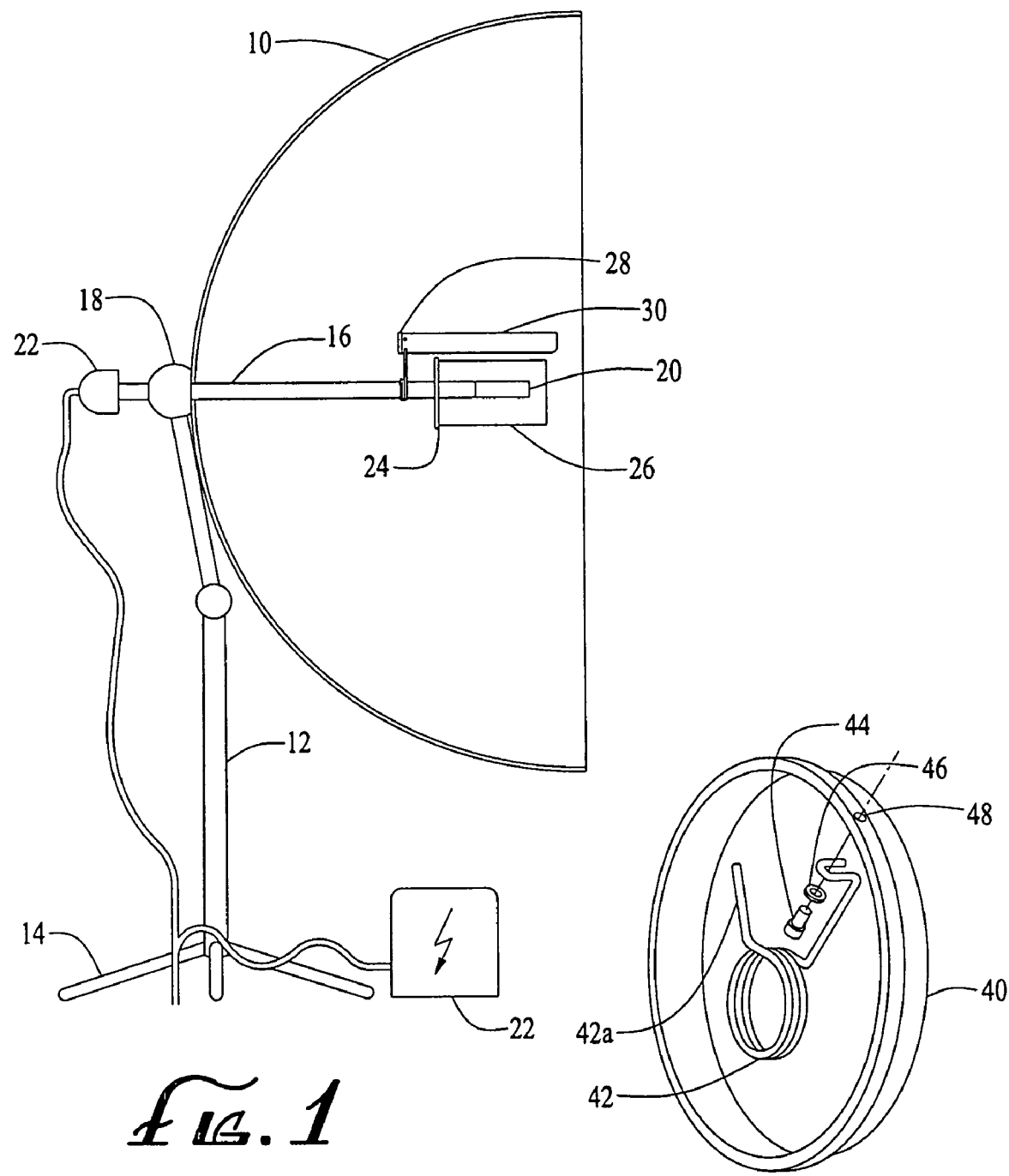

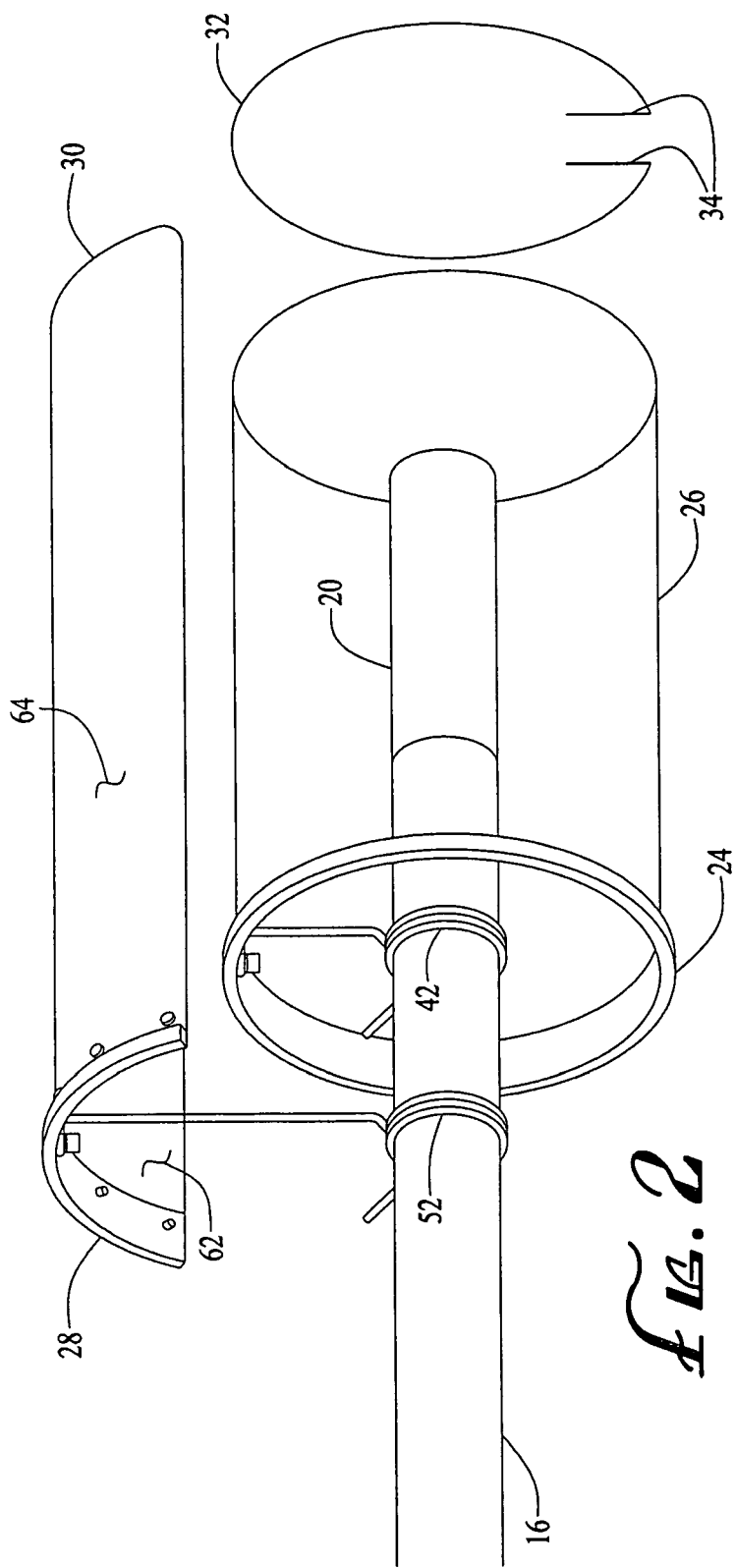
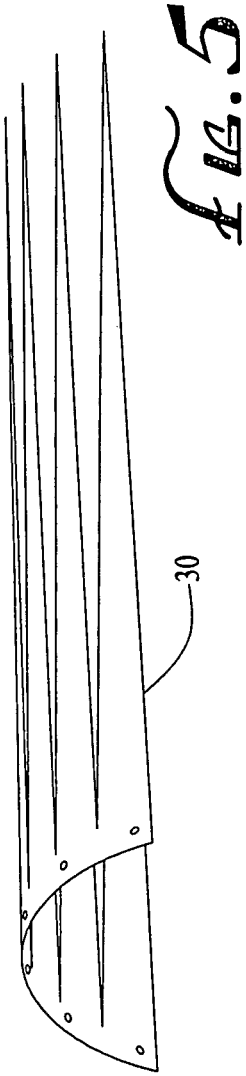

LIGHT CONTROL AND SHADING APPARATUS AND METHODS

BACKGROUND OF THE INVENTION

1. Field of the Invention

The invention relates generally to stage and studio lighting, and motion picture, video, film and still photography and more specifically is directed to apparatus and methods to attain color correction, color enhancement, softening of light, neutral density and gelling for umbrella reflectors and the like.

2. Description of the Related Art

Color correction and gelling of umbrella reflector systems has been a problem in many respects. The conventional methods of achieving color correction, gelling, softening and neutral density has many disadvantages. In conventional systems, a way to achieve color correction, gelling etc., is to cover the entire reflector with a color correction filter or gel. In larger size umbrella reflectors, this involves taping together sections of the material being used to achieve total coverage for the umbrella.

The disadvantages in using conventional methods include the need to use large, expensive sheets of color correction filters or gels. This method is not only time consuming, but labor intensive because it requires cutting the gels to shape and placing the gels onto the reflector. This may require the use of large, expensive strands that are heavy and impractical. For standard to large size umbrellas, this method requires more than one person to set up. The storage space required for this conventional gelling technique is another disadvantage. Thus, a need exists for apparatus and methods that overcome the problems and disadvantages in conventional color correction and shading methods used for stage and studio lighting and for motion picture, video, film and still photography.

SUMMARY OF THE INVENTION

The present invention solves the problem of color correction, gelling and shading for reflector systems such as umbrella reflectors or balloons used in stage and studio lighting and for motion picture, video, film and still photography. Whether the shape is round, square, or rectangular, including balls and tubes, the present invention is suitable for color correction and gelling requirements. The invention can be assembled in a short amount of time by a single person and requires much less material than convention systems and methods.

One embodiment of the present invention is an apparatus used for color correction, light softening and attaining neutral density with a photographic reflector. Embodiments of the invention include a gel holder and a shade holder that can be used separately or together. The invention allows the user to add color, eliminate or reduce reflected color and to shape, shade, diffuse, soften, absorb, block, reflect, refract and dim light at the light source used with the reflector. The positions of the gel holder and the shade holder on the focus tube and about the light source can be modified to mix, blend and shape the light, create special effects, add texture, eliminate hot spots and create shadows. A user can thus fine tune the desired lighting effects by adjusting the position of the gel holder and/or the reflector holder on the focus tube. The invention includes the use of two or more shade holders to further expand the range of lighting and shading effects.

Using conventional methods, a standard 330 cm umbrella reflector would require about thirty square feet of color correction filter or gel, would require approximately thirty minutes to prepare the gel and approximately five minutes for two persons to mount and set-up. In contrast, using the present invention, the 330 cm umbrella reflector would use approximately one square foot of color correction filter or gel, would require approximately thirty seconds to prepare the gel and approximately ten seconds for one person to mount and set-up. A common set-up in the film and photography lighting is using a diffusion gel, a ¼ color transfer orange (CTO) color correction and a colored gel. This common set-up requires ninety square feet of color correction film, gel and diffusion material. However, only approximately three square feet of gel is needed using the present invention.

Further advantages and embodiments of the invention will be apparent to persons skilled in the art from the drawings and description set forth herein.

BRIEF DESCRIPTION OF THE DRAWINGS

FIG. 1 illustrates the gel holder and shade apparatus mounted in an umbrella reflector in one embodiment of the present invention.

FIG. 2 illustrates the shade apparatus holder with the shade installed on the focus tube mounted in combination with the gel holder with an installed gel on the focus tube in one embodiment of the present invention.

FIG. 3 illustrates an exploded view of the gel holder hardware having an aluminum ring, torsion spring, screw and washer in one embodiment of the present invention.

FIG. 5 illustrates the shade used in the shade apparatus in one embodiment of the present invention.

DETAILED DESCRIPTION OF EMBODIMENTS OF THE INVENTION

Figure 4:
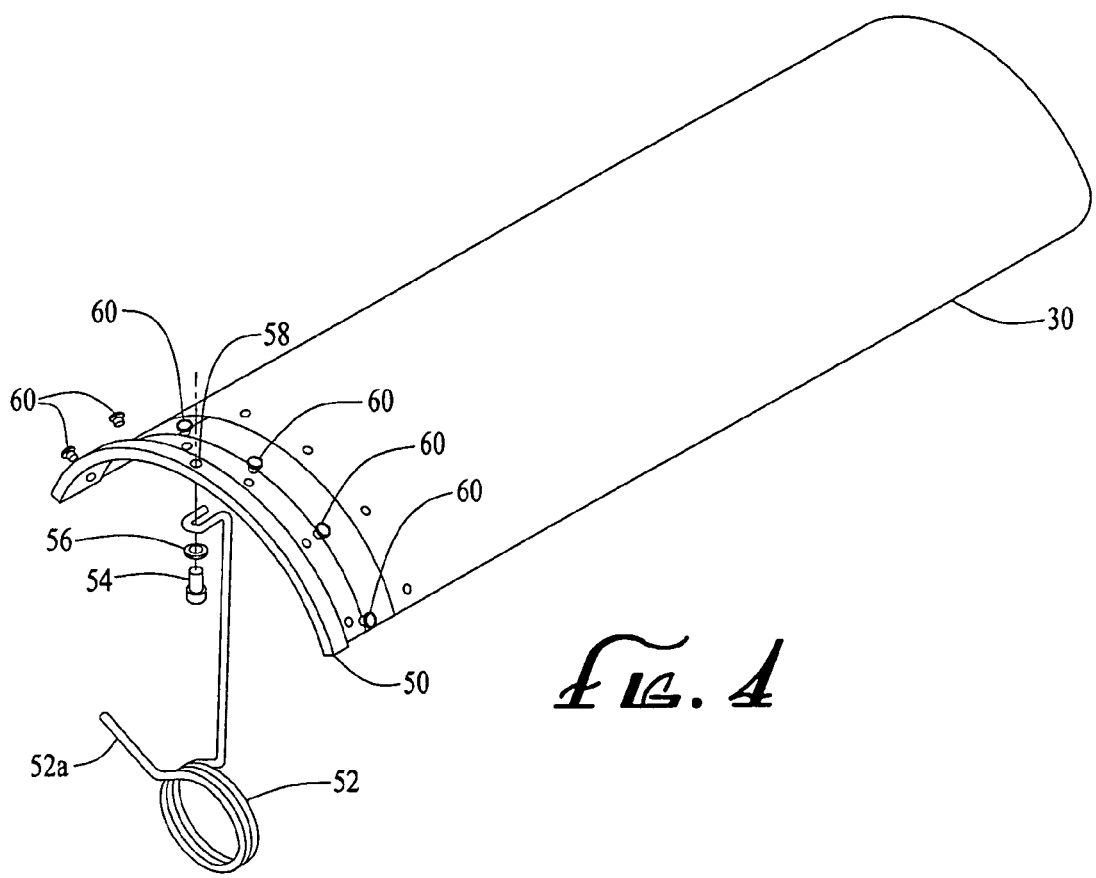
FIG. 4 illustrates the shade apparatus holder hardware in one embodiment of the present invention.

FIG. 1 illustrates one embodiment of the invention with an arrangement of light controlling elements at a reflector 10. The reflector 10 is mounted onto a stand 12 with legs 14 as shown in FIG. 1. The focus tube 16 is secured adjacent to the reflector 10 by a focus tube support 18 having a light source or lamp 20 at one end of the focus tube 16. As shown in FIG. 1, a power supply 22 supplies electrical power to the lamp 20 by an electrical connector 22 that is connected to the power supply 22.

In the embodiment shown in FIG. 1, the gel holder 24 is removably and adjustably secured to the focus tube 16. The gel holder 24 is attached to the gel 26 and placed so that the gel 26 surrounds the lamp 20. The shade holder 28 is removably secured to the focus tube 16 and is attached to the shade 30 and placed so that the shade 30 is proximate to the gel 26.

As shown in more detail in one embodiment in FIG. 2, the gel holder 24 is a ring 40 made from aluminum, metal, composite fiber or phenolic material, graphite or carbon fiber. In one or more embodiments, the ring 40 can be round, oval, square, rectangle, pentagon, octagon, crescent shaped and other configurations known to skilled persons. The ring 40 can be any color and can be made of a single piece or assembled from two or more pieces by welding or glue. A torsion spring 42 is connected to the ring 40 by the screw 44 and the washer 46 to an aperture 48 on the ring 40 in a conventional way known to persons skilled in the art and illustrated in FIG. 2 and FIG. 3. The torsion spring 42 can be made of any type of metal that can function as a spring to releasably grip the focus tube 16.

The gel 26 is made from one or more thin plastic films in one or more colors or combination of colors known to persons skilled in the art and includes gels made by Lee Filters or Rosco filters. In embodiments of the invention, the gel 26 is in a cylindrical configuration when connected to the gel holder 24 as shown in FIG. 2, but other and further configurations are within the scope of the invention.

Figure 6:
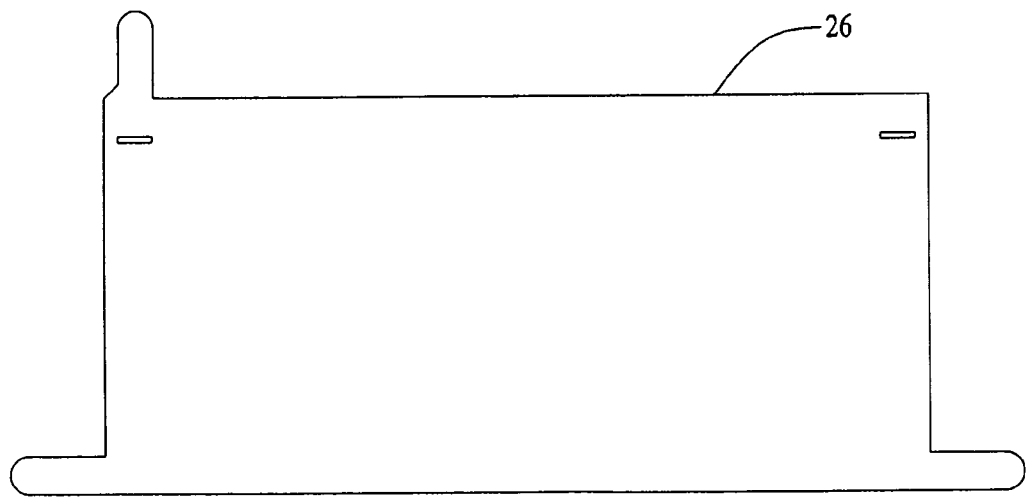
FIG. 6 illustrates the gel used with the gel holder in one embodiment of the present invention.
Figure 7:
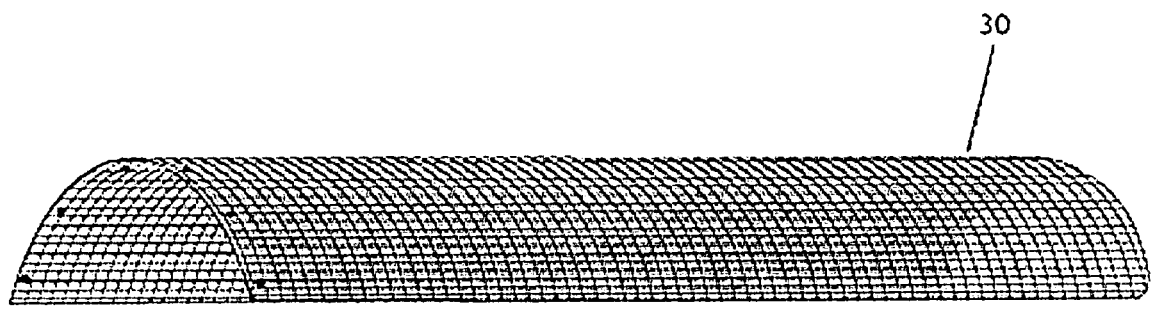
FIG. 7 illustrates an embodiment of the shade comprising a metal screen.
Figure 8:
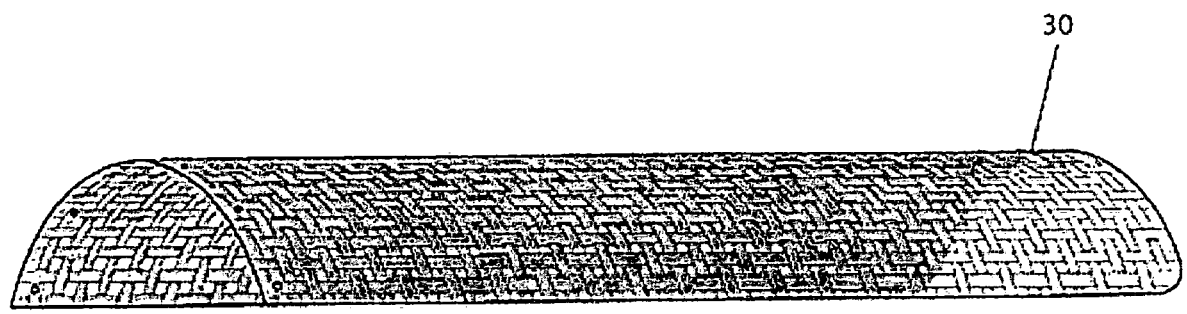
FIG. 8 illustrates an embodiment of the shade with an exemplary grid pattern thereon.

The gel 26 is in a flat sheet of material that is rolled up manually and secured to the gel holder 24 by tape, glue or any other conventional attachments known to skilled persons. In further embodiments, the gel 26 is made of aluminum or other metal fabric material as shown in FIG. 6. The metal fabric material such as shown in FIG. 6 can be cut and shaped into different configurations, including diamond shapes and other cut-out design configurations, and secured to the gel holder 24 by using tabs and slots as shown in FIG. 6. In additional embodiments of the invention, the gel 26 includes any material used to change color, tint, hue, and to dim or add special light characteristics for use in stage, studio, film, still photography and video lighting.

In further embodiments, the gel stiffener 32 is placed onto the gel 26 as illustrated in FIG. 2 to provide rigidity to the gel 26 that is attached to the gel holder 24. The gel stiffener 32 is shaped to correspond to the configuration of the gel 26 and is applied to the gel by squeezing end portions 34 of the gel stiffener 32 and placing the gel stiffener 32 on the inside of the gel 26. The gel stiffener 32 is of a generally square cross section and is made of aluminum or other materials known to persons skilled in the art, however other cross sectional shapes and other materials are within the scope of the present invention.

As can be appreciated from FIG. 1 and FIG. 2, the position of the gel holder 24 can by adjusted by pressing the extension 42a of the torsion spring 42 and then moving the gel holder 24 to a different position on the focus tube 16 and then releasing the extension 42a so that the torsion spring 42 then grips the focus tube 16. In this manner, the gel holder 24 with the gel 26 can thus be moved back and forth along the focus tube 16 to control and obtain the light effect or gelling that is desired.

As shown in FIG. 2, the shade holder 28 is a ring segment 50 made from aluminum, metal, composite fiber or phenolic material, graphite or carbon fiber and can be made into configurations known to skilled persons. The ring segment 50 can be any color and made of a single piece or assembled from two or more pieces by welding or glue. A torsion spring 52 is connected to the ring segment 50 by the screw 54 and the washer 56 to an aperture 48 on the ring segment 50 in a conventional way known to persons skilled in the art and illustrated in FIG. 2 and FIG. 4. The torsion spring 42 is made of any type of metal that can function as a spring to releasably grip the focus tube 16.

As shown in FIG. 4, the shade 30 is secured to the ring segment 50 by one or more rivets 60 or by other conventional attachments such as screws known to persons skilled in the art. The shade 30 is semi-cylindrical in configuration or other configurations or different lengths. The shade 30 is made from aluminum but other and different materials and combination of materials are within the scope of the invention.

In further embodiments, the shade 30 includes colored surfaces 62 and 64, which can be one black colored surface to absorb light and one reflective surface to reflect light, both surfaces can be black or both surfaces can be reflective. In additional embodiments, the shade 30 is made from a metal screen or configured into a series of V-shapes such as shown in FIG. 5. The invention includes other configurations and shapes and lengths of the shade 30 all of which are within the scope of the present invention. In additional embodiments of the invention, the invention includes the use of two or more shading devices including two or more shade holders 28 with the shade 30 that are removably and adjustably mounted onto the focus tube 16 to provide for additional shading effects as desired by the user.

As can be appreciated from FIG. 2 and FIG. 4, the position of the shade holder 28 can by adjusted by pressing the extension 52a of the torsion spring 52 and then moving the shade holder 28 to a different position on the focus tube 16 and then releasing the extension 52a so that the torsion spring 52 then grips the focus tube 16. In this manner, the shade holder 28 with the shade 30 can thus be moved back and forth along the focus tube 16 to control the shading effects as desired. The present invention includes the use of two or more shade devices such as shade holder 28 with shade 30 to control the shading effects and includes the use of the shade holder 28 with the shade 30 without the gel holder 24 with the gel 26 and those embodiments are all within the scope of the present invention.

While the present invention has been described with regards to particular embodiments, it is recognized that additional variations of the present invention may be devised without departing from the inventive concepts in the claims and the invention includes the full breadth and scope of the claims including all equivalents.

What is claimed is:

1. A light control apparatus comprising:
a gel holder;
a gel comprising plastic film in one or more colors attached to the gel holder and configured to at least partially surround a lamp secured to a focus tube on a light reflector; and
a connector secured to the gel holder, the connector adapted to be releasably secured to the focus tube and selectively moveable along the focus tube so as to selectively position the gel adjacent the lamp, where the connector comprises a spring biased to be releasably secured to the focus tube.

2. The light control apparatus of claim 1 where the spring is a torsion spring with a manual release.

3. The light control apparatus of claim 1 where the gel holder is configured in a substantially circular configuration and the gel is configured in a substantially cylindrical configuration.

4. The light control apparatus of claim 1 where the gel comprises a color filter.

5. The light control apparatus of claim 1 further comprising a gel stiffener removably placed onto the gel.

6. A light control and shading system comprising:
a gel holder;
a gel attached to the gel holder and configured to at least partially surround a lamp secured to a focus tube on a light reflector;
a connector secured to the gel holder, the connector adapted to be releasably secured to the focus tube and moveable along the focus tube to selectively position the gel about the lamp; and
a shade holder having a shade and a shade holder connector, the shade holder connector adapted to be releasably secured to the focus tube and moveably positioned on the focus tube to selectively position the shade proximate to the gel.

7. The light control and shading apparatus of claim 6 where the connector comprises a spring biased to be releasably secured to the focus tube and the shade holder connector comprises a second spring biased to be releasably secured to the focus tube.

8. The light control and shading apparatus of claim 7 where the spring and the second spring are torsion springs.

9. The light control and shading apparatus of claim 6 where the shade has a substantially semi-cylindrical configuration.

10. The light control and shading apparatus of claim 6 where the shade comprises a grid pattern thereon.

11. The light control and shading apparatus of claim 6 where the shade comprises a metal screen.

12. The light control and shading apparatus of claim 6 where the gel comprises a color filter.

13. The light control and shading apparatus of claim 6 comprising a second shade holder having a second shade and a second shade holder connector, the second shade holder connector adapted to be releasably secured to the focus tube and moveably positioned on the focus tube to selectively position the second shade proximate to the gel.

14. A light shading apparatus comprising:
a shade holder;
a shade attached to the shade holder and configured to asymmetrically partially surround a lamp secured to a focus tube on a light reflector; and
a connector secured to the shade holder, the connector adapted to be releasably secured to the focus tube and selectively moveable along the focus tube so as to selectively position the shade proximate to the lamp, where the connector comprises a spring biased to be releasably secured to the focus tube.

15. A method for the control of lighting, comprising the steps of:
providing a gel holder, the gel holder adapted to be releasably secured to a focus tube used with a light reflector;
attaching a gel to the gel holder, the gel comprises color correction plastic film and configured to at least partially surround a lamp secured to the focus tube;
positioning the gel near the lamp by releasable securing the gel holder to the focus tube;
changing the position of the gel about the lamp by moving the gel holder on the focus tube;
removably securing a shade holder having a shade attached thereto to the focus tube; and
changing the position of the shade holder on the focus tube to selectively position the shade proximate to the gel, wherein a user can control the amount of color correction caused by the gel.

16. The method of claim 15 comprising the step of removably securing a second shade holder having a second shade attached thereto to the focus tube.

17. The method of claim 15 further comprising the step of removably attaching a gel stiffener to the gel.

\* \* \* \* \*